United States Patent Office.

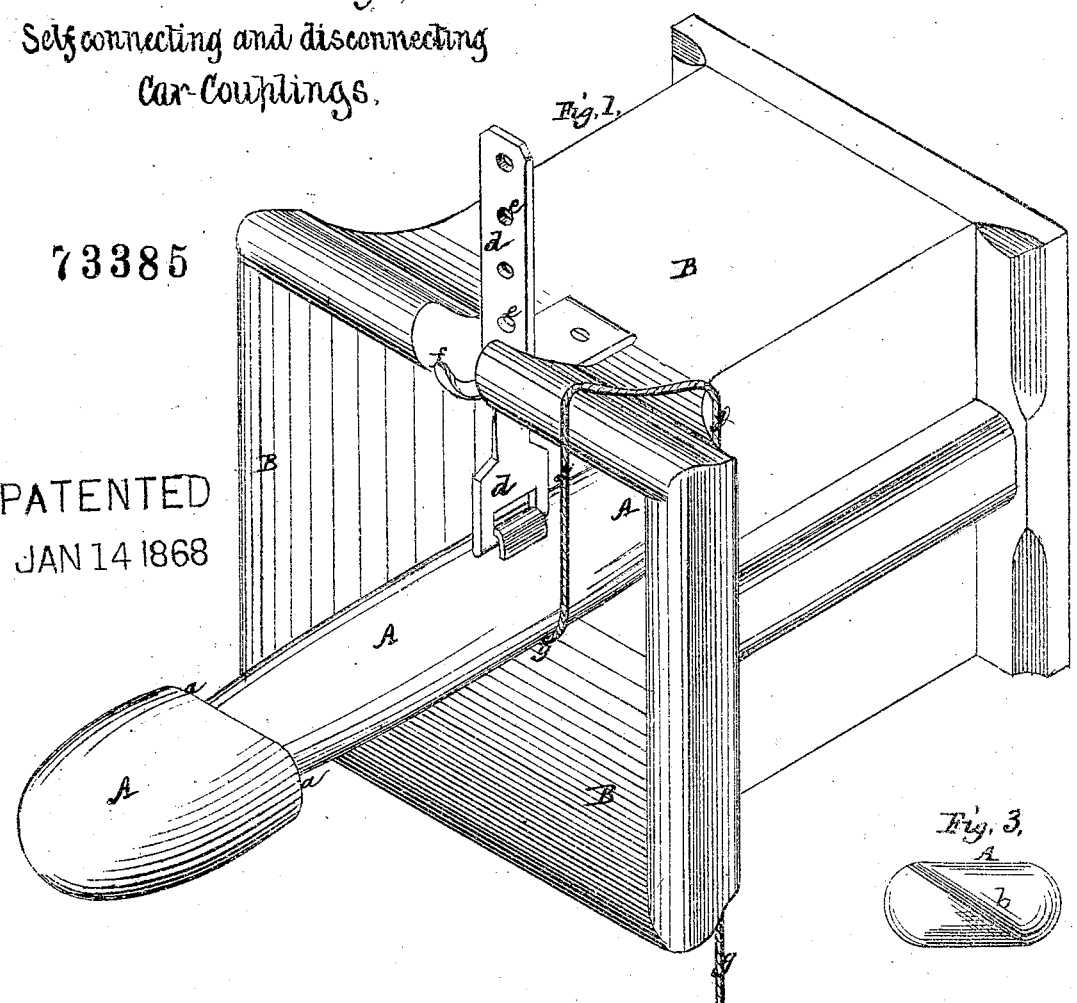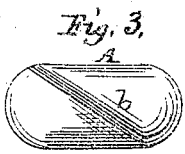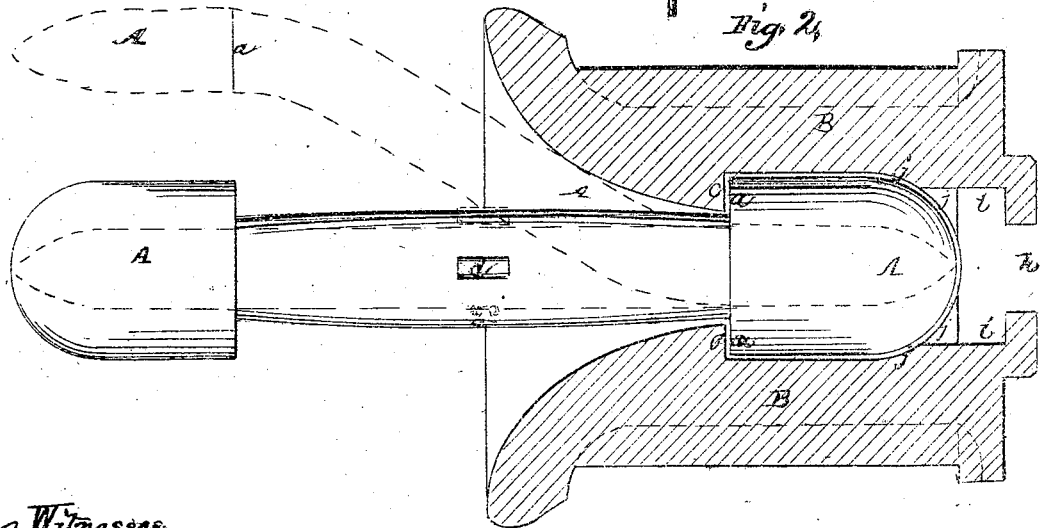

HORACE RESLEY, OF CUMBERLAND, MARYLAND.

Letters Patent No. 73,385, dated January 14, 1868.

IMPROVED CAR-COUPLING.

*The Schedule referred to in these Letters Patent and making part of the same.*

TO ALL WHOM IT MAY CONCERN:

Be it known that I, HORACE RESLEY, of Cumberland, in the county of Alleghany, and State of Maryland, have invented certain new and useful Improvements in Self-Connecting and Detaching Car-Couplings; and I do hereby declare the following to be a full, clear, and exact description of the same, reference being had to the accompanying drawings, making a part of this specification, in which—

Figure 1 represents in perspective one of the coupling-boxes, with the coupling-link or bar in position in it.

Figure 2 represents a horizontal section through the same.

Figure 3 represents a view of the end of the coupling-link or bar, showing the bevelled form thereof.

Similar letters of reference, where they occur in the separate figures, denote like parts in all of the drawings.

My invention relates to that kind of self-acting car-couplings in which the coupling-link or bar, in connecting or disconnecting itself from the adjacent cars, has a rolling motion around its long axis, as will be explained.

To enable others skilled in the art to make and use my invention, I will proceed to describe the same with reference to the drawings.

The coupling-link or bar A may be straight, as shown by the black lines, or of a "goose-neck" form, as shown by the blue lines in fig. 2; and its heads are made with shoulders, $a\ a$, so as to catch and draw upon both sides of the head. The ends of the link or bar A are so bevelled off, as at $b$, fig. 3, as that, when they strike against the flaring portion of the box or head B, it will rock or roll in the line of its length, and the narrow part of said end freely enter the opening in the box B, and then roll or rock back again, so that the shoulders $a$ shall take and hold against the sides or shoulders $c\ c$ of the box. For the sake of convenience, and to prevent rattling, or, possibly, the dropping out of the link or bar A, I propose to suspend it to the box B by a hinged metal strap, $d$, with holes, $e$, in it, to a pin or stud, $f$, in the box B; and a cord, $g$, is connected to the link or bar A, by which said bar or link may be slightly turned, to disconnect it from the box. The entire series of links or bars throughout the train may have their cords connected to a common cord, chain, rod, or other contrivance, so that the whole series may be uncoupled at once, or by one operation. The purpose of the "goose-neck" formed link or bar is to adapt the coupling to cars whose platforms may vary somewhat in height; or these links or bars may be swivelled at or near their centres, so that one end of it only may rock or roll to disconnect that end, leaving the other connected to the box. The rear of the box has an opening, $h$, through it for the rod, by which the box is attached to the car, or the latter drawn by, to pass through, and a recess, $i$, also, for the head of the bar, so that it need not enter into the box B, and occupy space therein. The corners of the box, as at $j$, are made rounding, to conform to the rounded form of the ends of the link or bar, so that the latter may move and not bind therein, but, at the same time, be prevented, by the motion of the train, from too much rattling motion.

When the link or bar A is in the position for entering the head or of leaving it, it represents an appearance like that shown by red lines in fig. 2, and quite narrow. By drawing from the two sides of the box, the tendency of the draught in going around a curve is to prevent the outer wheels from "climbing" the rails.

By my construction of couplings, the engineer may disconnect the cars of the train from each other, or from the engine, at will.

What I claim, and desire to secure by Letters Patent, is—

1. The links or bars A, with shouldered heads and bevelled ends, and suspended by a flexible connection, so that they can rock or turn in the line of their length when they are to connect or disconnect the train, substantially as described.

2. I also claim, in combination with the link or bar A, constructed and operating as above described, the box B, with shoulders $c\ c$ and rounded end $j$, as and for the purpose herein described and represented.

HORACE RESLEY.

Witnesses:
A. B. STOUGHTON,
EDM. F. BROWN.